(12) United States Patent
Yang et al.

(10) Patent No.: US 9,118,072 B2
(45) Date of Patent: Aug. 25, 2015

(54) COMPONENT FOR SECONDARY BATTERY AND MANUFACTURING METHOD THEREOF, AND SECONDARY BATTERY AND MULTI-BATTERY APPARATUS MANUFACTURED BY USING THE COMPONENT

(71) Applicant: LG CHEM, LTD., Seoul (KR)

(72) Inventors: Jung-Hoon Yang, Daejeon (KR); Seung-Don Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 13/873,299

(22) Filed: Apr. 30, 2013

(65) Prior Publication Data
US 2013/0236752 A1 Sep. 12, 2013

Related U.S. Application Data

(63) Continuation of application No. PCT/KR2012/006712, filed on Aug. 23, 2012.

(30) Foreign Application Priority Data

Sep. 16, 2011 (KR) .................. 10-2011-0093604
Aug. 23, 2012 (KR) .................. 10-2012-0092217

(51) Int. Cl.
*H01M 2/34* (2006.01)
*H01M 2/30* (2006.01)
(Continued)

(52) U.S. Cl.
CPC .............. *H01M 2/34* (2013.01); *H01H 85/044* (2013.01); *H01M 2/22* (2013.01); *H01M 2/30* (2013.01); *H01M 10/4235* (2013.01); *H01H 2085/025* (2013.01); *H01M 2200/00* (2013.01); *H01M 2200/103* (2013.01); *H01M 2220/20* (2013.01);
(Continued)

(58) Field of Classification Search
CPC combination set(s) only.
See application file for complete search history.

(56) References Cited

U.S. PATENT DOCUMENTS 3,148,257 A * 9/1964 Feenan et al. ................. 337/295
4,315,235 A   2/1982 Jacobs
(Continued)

FOREIGN PATENT DOCUMENTS

EP   1 344 597 A1   9/2003
JP   2001-195970 A   7/2001
(Continued)

OTHER PUBLICATIONS

International Search Report issued in PCT/KR2012/006712, mailed on Feb. 6, 2013.
(Continued)

*Primary Examiner* — Ula C Ruddock
*Assistant Examiner* — Scott J Chmielecki
(74) *Attorney, Agent, or Firm* — Birch, Stewart, Kolasch & Birch, LLP

(57) ABSTRACT

The present invention describes a component for a secondary battery and a manufacturing method thereof, and a secondary battery manufactured by using the component. The component for a secondary battery according to the present invention comprises a metal plate in which at least one recess line is formed; and a soldering pattern joined in the recess line. According to the present invention, when an over-current flows through the component for a secondary battery, breakage occurs at the portion where soldering pattern is joined in the recess line, thereby efficiently interrupting the flow of an over-current.

23 Claims, 10 Drawing Sheets

(51) Int. Cl.
*H01M 2/22* (2006.01)
*H01M 10/42* (2006.01)
*H01H 85/044* (2006.01)
*H02J 7/00* (2006.01)
*H01H 85/02* (2006.01)

(52) U.S. Cl.
CPC .......... *H01M 2220/30* (2013.01); *H02J 7/0031* (2013.01); *Y10T 29/49108* (2015.01)

(56) References Cited

U.S. PATENT DOCUMENTS

| | | | |
|---|---|---|---|
| 5,898,357 A * | 4/1999 | Endo et al. | 337/159 |
| 6,555,263 B1 * | 4/2003 | Kim et al. | 429/61 |
| 6,794,584 B2 | 9/2004 | Tanaka | |
| 7,060,911 B2 | 6/2006 | Tanaka | |
| 2003/0175146 A1 | 9/2003 | Yeh et al. | |
| 2009/0008434 A1 * | 1/2009 | Rothschild | 228/259 |
| 2009/0087694 A1 | 4/2009 | Park | |
| 2009/0159311 A1 | 6/2009 | Zheng et al. | |
| 2009/0305126 A1 * | 12/2009 | Choi et al. | 429/159 |
| 2010/0310911 A1 * | 12/2010 | Yamamoto et al. | 429/94 |
| 2010/0330402 A1 * | 12/2010 | Wang et al. | 429/53 |
| 2011/0104521 A1 * | 5/2011 | Kishimoto et al. | 429/7 |
| 2011/0104958 A1 * | 5/2011 | Kwon et al. | 439/816 |
| 2011/0115437 A1 * | 5/2011 | Kasai | 320/134 |
| 2011/0176254 A1 * | 7/2011 | Yawata et al. | 361/500 |
| 2011/0177365 A1 * | 7/2011 | Yasui et al. | 429/61 |
| 2012/0214023 A1 * | 8/2012 | Koh | 429/7 |
| 2013/0234822 A1 * | 9/2013 | Aurich et al. | 337/416 |
| 2013/0323549 A1 * | 12/2013 | Choi et al. | 429/62 |

FOREIGN PATENT DOCUMENTS

| | | |
|---|---|---|
| JP | 2002-222625 A | 8/2002 |
| JP | 2002-252036 A | 9/2002 |
| JP | 2004-63251 A | 2/2004 |
| JP | 2007-280898 A | 10/2007 |
| JP | 4098556 B2 | 3/2008 |
| JP | 2008-181822 A | 8/2008 |
| JP | 2009-099372 A | 5/2009 |
| JP | 2010-067475 A | 3/2010 |
| JP | 2011-510433 A | 3/2011 |
| KR | 10-0984576 B1 | 9/2010 |

OTHER PUBLICATIONS

Written Opinion of the International Searching Authority issued in PCT/KR2012/006712, mailed on Feb. 6, 2013.

* cited by examiner

COMPONENT FOR SECONDARY BATTERY AND MANUFACTURING METHOD THEREOF, AND SECONDARY BATTERY AND MULTI-BATTERY APPARATUS MANUFACTURED BY USING THE COMPONENT

CROSS-REFERENCE TO RELATED APPLICATION

The present application is a continuation of International Application No. PCT/KR2012/006712 filed on Aug. 23, 2012, which claims priority to Korean Patent Application No. 10-2011-0093604 filed in the Republic of Korea on Sep. 16, 2011, and Korean Patent Application No. 10-2012-0092217 filed in the Republic of Korea on Aug. 23, 2012, the disclosures of which are incorporated herein by reference.

TECHNICAL FIELD

The present invention relates to a secondary battery technology, and more particularly, to a component for a secondary battery which can improve the safety of a secondary battery and a method of manufacturing thereof, and a secondary battery manufactured by using the component.

BACKGROUND ART

With the increase in the use of portable electronic products such as video cameras, mobile phones, portable PCs, or the like, a secondary battery is commonly used as a main power source, and thus the importance of the secondary battery is growing.

Unlike a primary battery incapable of recharging, extensive research is undertaken regarding a secondary battery capable of charging and discharging so that they may be used in digital cameras, cellular phones, laptop computers, power tools, electric bicycles, electric vehicles, hybrid vehicles, large-capacity power storage apparatuses, or the like that are fast developing in the high-tech industry.

Particularly, since a lithium secondary battery has a higher energy density per unit weight and is capable of charging quickly compared to other secondary batteries such as lead accumulators, Ni—Cd batteries, Ni-MH batteries, Ni—Zn batteries, or the like, the use of a lithium secondary battery is increasing.

A lithium secondary battery has an operating voltage of 3.6 V or more and used as a power source of portable electric apparatuses, or multiple lithium secondary batteries are connected in series or in parallel to be used in high-power electric vehicles, hybrid vehicles, power tools, electric bicycles, power storage apparatuses, UPS, etc.

Also, since a lithium secondary battery has an operating voltage three times higher than those of Ni—Cd batteries or Ni-MH batteries and has excellent energy density characteristics per unit weight, the use of a lithium secondary battery is widely expanding.

Depending on the type of an electrolyte, a lithium secondary battery is categorized into a lithium ion battery using a liquid electrolyte and a lithium ion polymer battery using a polymer solid electrolyte. The lithium ion polymer battery is also divided into two types of batteries depending on the type of the polymer solid electrolyte: an all-solid lithium ion polymer battery containing no electrolyte solution and a lithium ion polymer battery containing an electrolyte solution and using a gel type polymer electrolyte.

Generally, a lithium ion battery using a liquid electrolyte is received in a cylindrical or prismatic metal can-shaped container and hermetically sealed for use. However, since a can-typed secondary battery using a metal can-shaped container is fixed in the shape thereof, electronic products having the can-typed secondary battery as a power source are limited in design, and have difficulty reducing their volume. Accordingly, a pouch type lithium secondary battery manufactured by receiving an electrode assembly and an electrolyte in a pouch packing made of a film, followed by sealing has been developed and in use.

However, a potential for explosion hazard may exist when a lithium secondary battery overheats, so ensuring the safety of a secondary battery is essential. The overheating of a lithium secondary battery is caused by various factors. One of the factors is the presence of an over-current in a lithium secondary battery. That is, if an over-current flows through a lithium secondary battery, heat is generated by Joule heating, and thus an internal temperature of the battery is quickly increased. Such an increase in temperature causes decomposition reaction of an electrolyte which brings about thermal running, causing the battery to inevitably explode. The over-current occurs when a sharp metal object penetrates a lithium secondary battery, or if an insulator between a cathode plate and an anode plate is destroyed by contraction of a separator being interposed between the cathode and anode plates, or if a rush current is applied to the battery due to an abnormal charge circuit or a load connected to the external.

In order to protect a lithium secondary battery from abnormalities such as an over-current, the battery is generally coupled to a protection circuit before use, and the protection circuit includes a fuse element which irreversibly disconnects a line where a charge or discharge current flows.

FIG. 1 is a circuit diagram showing the deposition structure and the operation mechanism of a fuse element in the configuration of a protection circuit coupled with a lithium secondary battery.

As shown in FIG. 1, the protection circuit includes a fuse element 10 for protecting a battery pack when an over-current occurs, a sense resistor 20 for sensing an over-current, a microcontroller 30 for monitoring the generation of an over-current and operating the fuse element 10 when an over-current occurs, and a switch 40 for switching the inflow of an operation current into the fuse element 10.

The fuse element 10 is installed in a main line connected to the outermost terminal of a cell assembly 20. The main line is a wire in which a charge current or discharge current flows. FIG. 1 shows that the fuse element 10 is installed in a high-voltage line (Pack+).

The fuse element 10 has three terminals, among these, two terminals are in contact with the main line in which a charge or discharge current flows, while the remaining one terminal is in contact with the switch 40. Also, the fuse element 10 includes a fuse 11 serially connected with the main line and melted at a predetermined temperature and a resistor 12 which applies heat to the fuse 11.

The microcontroller 30 monitors whether an over-current occurs or not by periodically detecting the voltage of both ends of the sense resistor 20, and when the occurrence of an over-current is determined, the microcontroller 30 turns on the switch 40. Then, the current which flows in the main line is bypassed to the fuse element 10 and applied to the resistor 12. Thereby, Joule heat generated from the resistor 12 is conducted to the fuse 11 to increase a temperature of the fuse 11, and when the temperature of the fuse 11 reaches the melting temperature, the fuse 11 melts, and thus the main line is irreversibly disconnected. When the main line is disconnected, an over-current no longer flows, thereby overcoming the problems associated with the over-current.

However, there are many problems in the conventional technology described above. That is, if there is a problem with the microcontroller 30, the switch 40 may not turn on even when an over-current occurs. In this case, since a current does not flow into the resistor 12 of the fuse element 10, there is a problem in that the fuse element 10 will not operate. In addition, a space for disposing the fuse element 10 is separately required in the protection circuit, and a program algorithm for controlling the operation of the fuse element 10 has to be loaded in the microcontroller 30. As a result, the space efficiency of the protection circuit deteriorates and the load of the microcontroller 30 increases.

DISCLOSURE

Technical Problem

The present invention is designed to solve the problems of the prior art, and therefore it is an object of the present invention to provide a new type of component for a secondary battery, configured to implement a function which manually interrupts an over-current in a secondary battery, separately from the active over-current interrupting function of a protection circuit, and a method of manufacturing the component.

It is another object of the present invention to provide a component for a secondary battery, which can manually interrupt an over-current with a minimum structural change while maintaining an overall shape identical to that of a conventional component, and a method of manufacturing the component.

It is still another object of the present invention to provide a secondary battery and a multi-battery apparatus manufactured by using the component for a secondary battery.

However, the present invention is not limited to the technical problems described above, and those skilled in the art may understand other technical problems from the following description.

Technical Solution

The inventors of the present invention have endeavored to improve the safety of a lithium secondary battery, and found out that when a recess line was formed on a plate shaped-electrode lead made of a metal, and then a lead-free soldering material having a melting point of 150° C. to 300° C. was coupled to the electrode lead, safety problems associated with an over-current may be overcome. The inventors also have confirmed that the electrode lead having the above-mentioned structure may be applied to all types of secondary batteries, as well as be widely used as a component capable of replacing various kinds of secondary battery components positioned at a current flow path.

In order to achieve the above-mentioned objects, there is provided a component for a secondary battery comprising a metal plate having at least one recess line; and a soldering pattern joined in the recess line.

According to an embodiment of the present invention, the width of the inner bottom portion of the recess line may be narrower than the width of the metal plate.

According to an embodiment of the present invention, the bottom portion may be non-continuously formed in the width-direction of the metal plate. According to an embodiment of the present invention, the recess line has any one pattern selected from a straight pattern, a zigzag pattern, a saw-toothed pattern, a wave pattern, and a combination thereof. Further, the recess line may have a continuous or non-continuous line pattern. Furthermore, the recess line may be formed on the top surface of the metal plate, the bottom surface thereof, or both.

Preferably, the soldering pattern has a melting point of 100° C. to 250° C. and is made of a lead-free soldering material containing tin (Sn) and copper (Cu) as a main ingredient, and containing no lead (Pb). The content of tin is in the range of 65 to 99.9 wt % and the content of copper is in the range of 0.01 to 35 wt %.

Optionally, the soldering pattern comprises a soldering material further containing at least one additional metal selected from nickel (Ni), zinc (Zn), and silver (Ag). The content of the additional metal is in the range of 0.01 to 20 wt %.

Preferably, the soldering pattern has a cross-section selected from a square shape, a triangle shape, a trapezoid shape, a semiellipse shape, a semicircle shape, and a combination thereof.

Optionally, the component for a secondary battery further comprises an insulating tape for covering the soldering pattern.

The purpose of the present invention is also achieved by providing a secondary battery and a multi-battery apparatus manufactured by using the component for a secondary battery according to the present invention.

According to an aspect of the present invention, the secondary battery comprises an electrode assembly in which a cathode lead and an anode lead are electrically coupled to each other; and a packing for sealing the electrode assembly to externally expose a part of the cathode lead and the anode lead, wherein the component for a secondary battery is used as the cathode lead, the anode lead, or both.

According to another aspect of the present invention, a multi-battery apparatus comprises a plurality of secondary batteries electrically connected to each other, and a connector for connecting secondary batteries to each other, wherein the component for a secondary battery is used as the connector.

According to still another aspect of the present invention, a multi-battery apparatus comprises two or more secondary battery modules having a plurality of secondary batteries therein, and external terminals connected to the modules by using connectors, wherein the component for a secondary battery is used as the connectors, external terminals or both.

According to still another aspect of the present invention, a multi-battery apparatus comprises two or more secondary battery packs having a plurality of secondary battery modules therein, and external terminals connected to the packs by using connectors, wherein the component for a secondary battery is used as the connectors, external terminals, or both.

In order to achieve the object described above, a method of manufacturing a component for a secondary battery, comprises (1) forming at least one recess line on the surface of a metal plate; and (2) forming a soldering pattern in the recess line.

According to another aspect of the present invention, in step (1), the recess line is formed by using any one selected from an etching technology, a cutting technology, a scratching technology, an etching technology using an electron beam, and a skiving technology. The recess line is formed at the upper surface of the metal plate, the bottom surface thereof or both.

According to the method of manufacturing a component for a secondary battery, the method further comprises covering the soldering pattern with an insulating tape on the top thereof.

According to the method of manufacturing a component for a secondary battery, step (2) includes a step of disposing a soldering material in the recess line; and a step of applying a thermal energy and pressure to the soldering material. The soldering material is a soldering wire having a cross-sectional structure corresponding to the shape of the recess line or a soldering paste having soldering powders dispersed therein. The thermal energy is applied by using any one selected from a thermal conductivity method, an ultrasonic vibration method, an electron-beam radiation method, an electromagnetic inducing method, and a combination thereof.

Advantageous Effects

In accordance with an aspect of the present invention, when an over-current flows through a component for a secondary battery, a soldering pattern-joined area of a recess line breaks to irreversibly interrupt the flow of an over-current. Also, since the recess line occupies a small area in an electrode lead, the resistance increase due to the presence of the soldering pattern is limited to an ignorable level, and substantial changes associated with the overall size and shape of the component are not resulted.

In accordance with another aspect of the present invention, when the component for a secondary battery is used as an electrode lead of a secondary battery, separately from a protection circuit, the secondary battery may irreversibly interrupt an over-current, thereby improving the safety of the secondary battery. In addition, when the component for a secondary battery is used as an electrode lead, no substantial changes are made in the size and shape of the electrode lead, so that it is possible to graft an over-current interrupting function onto a secondary battery without a structural modification in design of a secondary battery.

Still another aspect of the present invention, it is advantageous in that the component for a secondary battery may be applied to various kinds of secondary batteries adopting an electrode lead having a plate shape therein.

Still another aspect of the present invention, if the component for a secondary battery is used as an external terminal or a connector used in a multi-battery apparatus having a plurality of secondary batteries therein, the external terminal or the connector may have the over-current interrupting function.

DESCRIPTION OF DRAWINGS

Other objects and aspects of the present invention will become apparent from the following descriptions of the embodiments with reference to the accompanying drawings in which.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
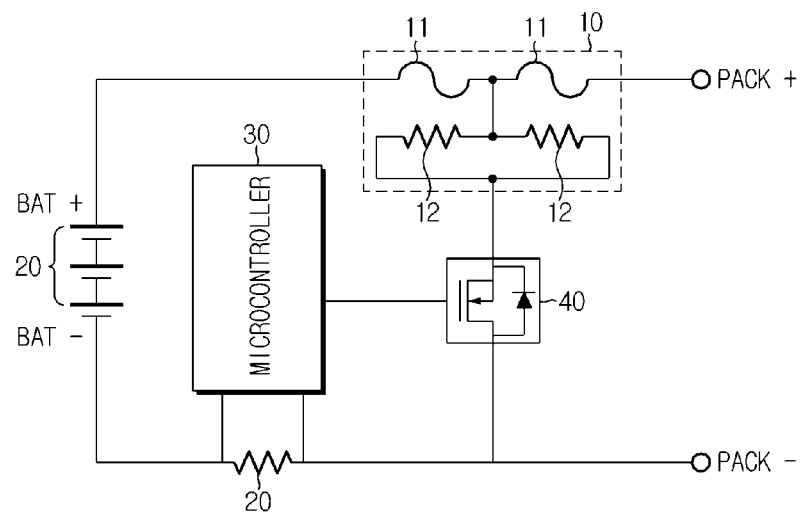
FIG. 1 is a circuit diagram showing the disposition structure and the operation mechanism of a fuse element in the configuration of a protection circuit coupling to a lithium-secondary battery.
Figure 2:
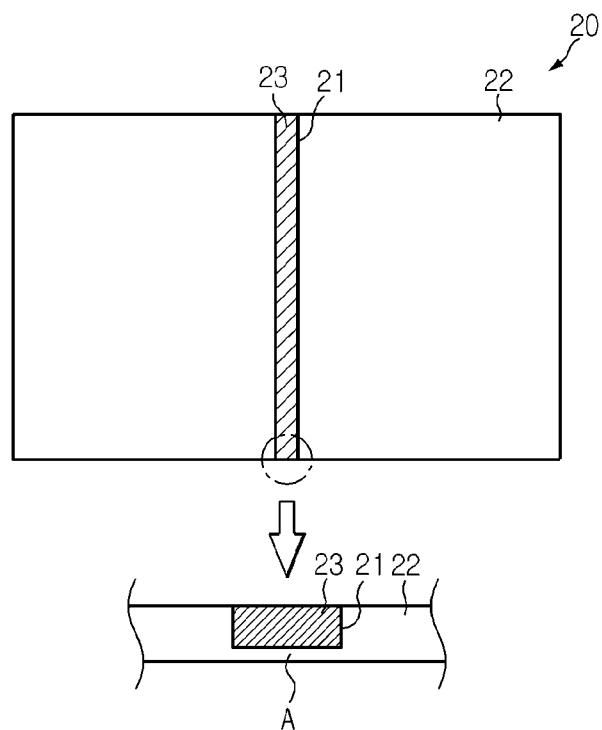
FIG. 2 shows a plain view and a partial cross-sectional view of a component for a secondary battery according to an embodiment of the present invention.

FIG. 2 shows a plane view and a partial cross-sectional view of a component for a secondary battery according to an embodiment of the present invention;

Referring to FIG. 2, a component 20 for a secondary battery according to the present invention includes a metal plate 22 having at least one recess line 21 thereon and a soldering pattern 23 joined in the recess line 21.

The component 20 for a secondary battery is characterized in that when an over-current flows through the metal plate 22, the soldering pattern 20-joined area of the recess line 21 breaks.

That is, when an over-current flows through the component 20 for a secondary battery, a lot of heat is generated by resistance heating in portion A of the metal plate (herebelow, called a local heating area A) below the soldering pattern 23.

More specifically, in the local heating area A, the resistance locally increases due to the rapid decrease of the thickness of the metal plate 22, and a relative resistance difference between the metal plate and a material constituting the soldering pattern 23 causes most of over-current to quickly flow through the local heating area A resulting in a large amount of resistance heating, and thus, when an over-current flows, the temperature of the local heating area A immediately increases over a melting point of the metal plate 22.

The resistance heating also occurs in the soldering pattern 23—joined area by an over-current, so that the temperature of the soldering pattern 23 increases over a melting point of the material constituting the soldering pattern 23.

Since the temperature of the local heating area A increases quicker than the temperature of the soldering pattern 23, the heat generated in the local heating area A is conducted to the soldering pattern 23. Therefore, the temperature of the soldering pattern 23 rapidly increases to a melting point thereof.

Thus, when the temperature of the local heating area A and the temperature of the soldering pattern reach to their own melting point by an over-current, the metal plate 22 breaks into two pieces along the joining area of the soldering pattern 23, thereby irreversibly interrupting a path capable of flowing an over-current.

The metal plate 22 consists of a single metal or an alloy made of different kinds of metals, having an electrical resistance of 0.1 mΩ or less and a fine electrical conductivity. For example, the metal plate 22 may be made of a copper substrate, an aluminum substrate or a copper substrate coated with nickel. Alternatively, the metal plate 22 may have a structure in which two or more thin metal plates are joined by using a cladding technology. For example, the metal plate 22 may have a structure in which both surfaces of a copper plate are clad with nickel plate.

The recess line 21 has a uniform width, a uniform depth, and a uniform cross-sectional area. The width of the recess line 21 is numbers of mm or less, preferably 5 mm or less, more preferably 3 mm or less, most preferably 1 mm or less. Also, the depth of the recess line 21 is preferably 25 to 75% T, more preferably 50 to 85% T, most preferably 60 to 95% T.

The width, the depth, and the cross-sectional area of the recess line 21 affect the resistance of the local heating area A. Therefore, the width, the depth, and the cross-sectional area of the recess line 21 may be appropriately selected within the above-mentioned range in consideration of a maximum voltage and a maximum current condition allowable in the component 20 for a secondary battery, an over-current level intended to interrupt by using a component 20 for a secondary battery, and an electrical property (resistance) or a physical property (tensile strength), intended to assign to a component 20 for a secondary battery.

The recess line 21 may be performed by using any one selected from a physical or chemical etching technology, a mechanical cutting technology using a saw blade or the like, a local scratching technology using a high hardness knife such as a diamond, an etching technology using an electron beam, and a skiving technology.

The soldering pattern 23 consists of a lead-free soldering material having a melting point of 100° C. to 250° C.; and containing tin (Sn) and copper (Cu) as a main ingredient, instead of lead (Pb) which is noxious on the environment and the human body.

The melting point of the soldering pattern 23 is determined in consideration of a maximum voltage and a maximum current condition allowable in the component 20 for a secondary battery, an over-current level intended to interrupt by using a component 20 for a secondary battery, and an electrical property (resistance) or a mechanical property (tensile strength), intended to assign to a component 20 for a secondary battery.

If a melting point of the soldering pattern 23 is less than 100° C., the component 20 for a secondary battery may break despite a normal current flow. For example, if the component 20 for a secondary battery is used in a secondary battery for electric vehicles and a melting point thereof is less than 100° C., the component 20 for a secondary battery may break by a rapid charge or discharge current. Also, if a melting point is higher than 250° C., it is difficult to efficiently interrupt an over-current, thereby presenting no advantageous effects of using the component 20 for a secondary battery.

The contents of tin and copper contained in the soldering pattern 23 are properly adjustable depending on a melting point of the soldering pattern 23 and an electrical property or a physical property, intended to assign to a soldering pattern 23 or a component 20 for a secondary battery.

Among the constituents of the soldering pattern 23, tin affects the melting point and tensile strength characteristics of the soldering pattern 23. In order for the soldering pattern 23 to have a melting point in the range of 100° C. to 250° C. and also have fine tensile strength characteristics, the content of tin is adjusted to 65 wt % or more, preferably in the range of 65 to 99.9 wt %. The wt % which is used herein refers to a unit based on the total weight of the materials comprised in the soldering pattern 23 and has the same meaning below.

Among the constituents of the soldering pattern 23, copper affects the electric conductivity, the melting point, and tensile strength of the component of a secondary battery. In this regard, the content of copper is preferably adjusted in the range of 0.01 to 35 wt %.

As mentioned above, by adjusting the contents of tin and copper in the range such as above, not only is the fine tensile strength of the soldering pattern achieved but also the increase of resistance by the soldering pattern 23 may be restrained within a low level of a number of %. Also, the melting point of the soldering pattern 23 may be adjusted in the range of 100° C. to 250° C.

Optionally, in order to improve an electric property or a mechanical property, the soldering pattern 23 may further include at least one additional metal selected from nickel (Ni), zinc (Zn), and silver (Ag).

The content of the additional metal may be adjusted based on the electrical property or the mechanical property, intended to assign to the soldering pattern 23. Preferably, the content of the additional metal may be adjusted in the range of 0.01 to 20 wt %.

Figure 3:
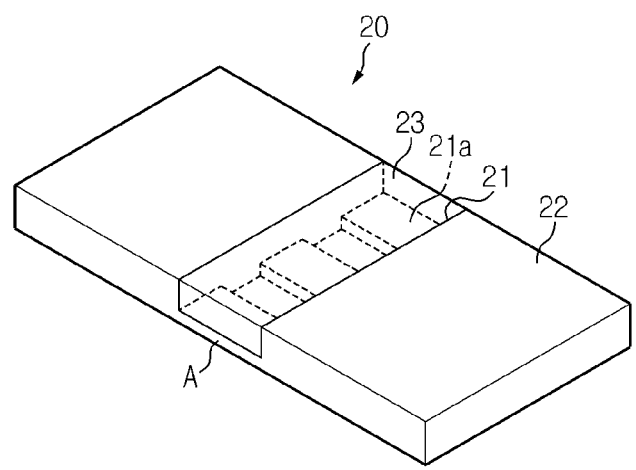
FIG. 3 is a perspective view showing a modification of the inner bottom portion of a recess line with respect to a component for a secondary battery of FIG. 2.
Figure 4:
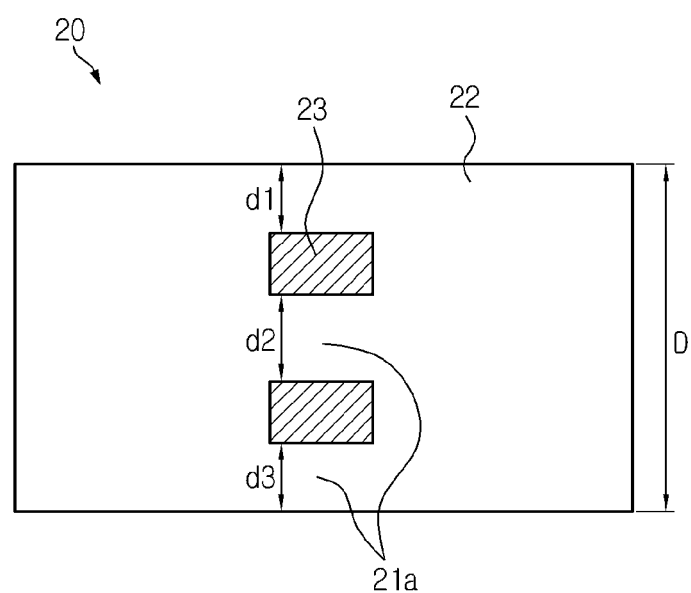
FIG. 4 is a bottom view showing a component for a secondary battery of FIG. 3.

Meanwhile, FIG. 3 is a perspective view showing a modification of the inner bottom portion of a recess line with respect to a component for a secondary battery of FIG. 2 and FIG. 4 is a bottom view showing a component for a secondary battery of FIG. 3.

Referring to FIGS. 3 and 4, the component 20 for a secondary battery according to an embodiment of the present invention may have a structure in which the inner bottom portion 21a of a recess line 21 has a width (d1+d2+d3, see FIG. 4) narrower than the width (D, see FIG. 4) of a metal plate 22. That is, the components 20 for a secondary battery of FIGS. 3 and 4 have a structure in which a part of the inner bottom portion 21a of the recess line 21 has a perforated form.

Such a structure causes a cross-section of a current path to decrease, so when an over-current flows through a local heating area A (i.e., a bottom portion 21a), a lot of heat is generated. Therefore, the breakage of the component 20 for a secondary battery easily occurs.

Figure 5:
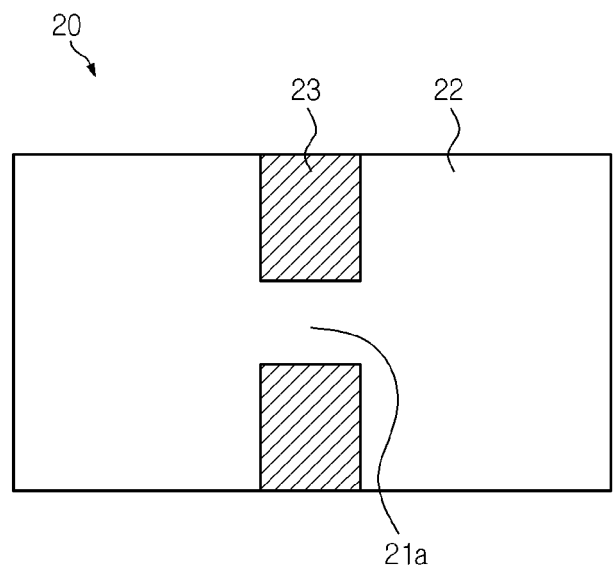
FIG. 5 is a bottom view showing a modification of a bottom portion with respect to a component for a secondary battery of FIG. 4.

Meanwhile, FIGS. 3 and 4 show a case in which three bottom portions 21a are non-continuously formed in the width-direction of the metal plate 22, but the present invention is not limited thereto. That is, the component 20 for a secondary battery according to an embodiment of the present invention may have a structure of which one bottom portion 21a is positioned at the center of the metal plate 22 in the width-direction thereof as shown in FIG. 5. Also, any component having a structure capable of reducing the cross-section of the metal plate 22 on the current flow path, may be applied without limitation.

Figure 6:
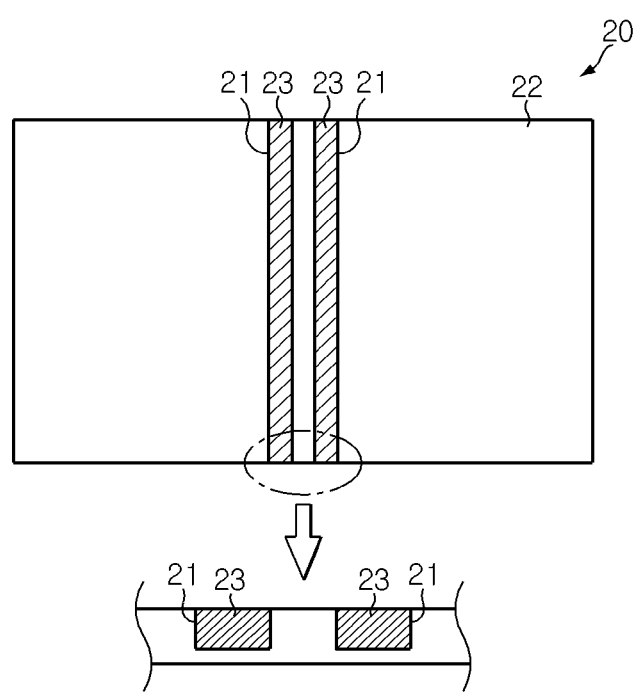
FIG. 6 shows a plain view and a partial cross-sectional view of a component for a secondary battery according to another embodiment of the present invention.

FIG. 6 shows a plane view and a partial cross-sectional view of a component for a secondary battery according to another embodiment of the present invention.

Referring to FIG. 6, two or more of recess lines 21 may be formed on a metal plate 22, and a soldering pattern 23 may be individually joined in each recess line 21. Of course, it is possible to form three or more of the recess lines 21.

Figure 7:
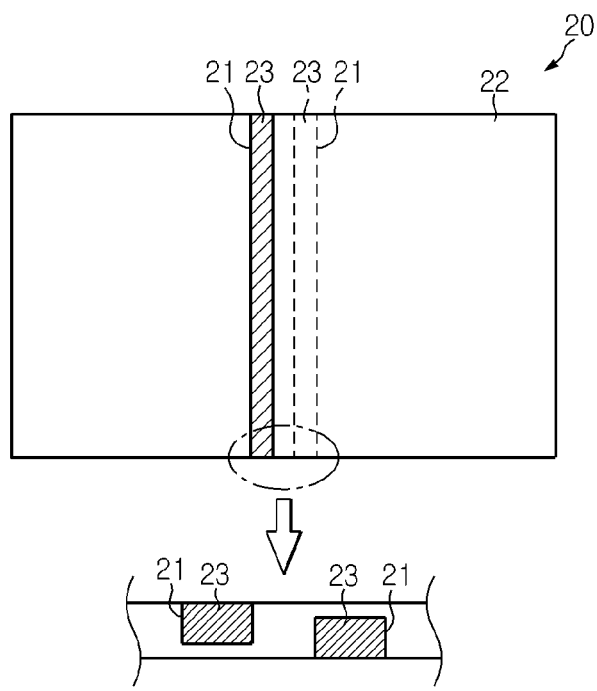
FIG. 7 shows a plain view and a partial cross-sectional view of a component for a secondary battery according to still another embodiment of the present invention.
Figure 8:
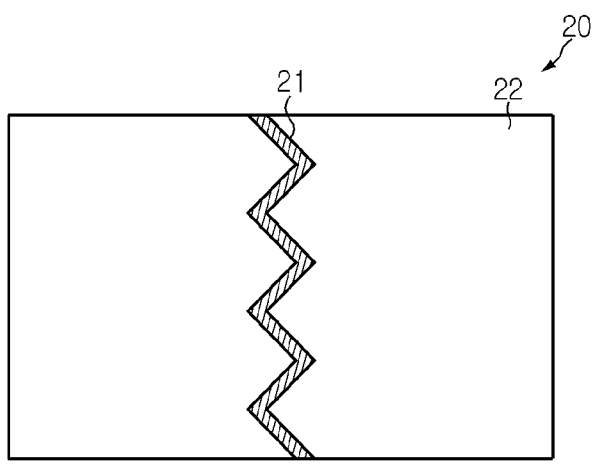
FIGS. 8 to 10 are plane views showing various patterns of a recess line, which may be formed in a component for a secondary battery according to the present invention.
Figure 9:
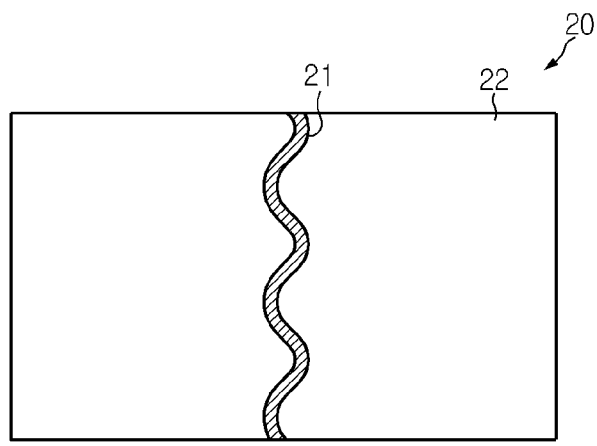

FIG. 7 shows a plane view and a partial cross-sectional view of a component for a secondary battery according to still another embodiment of the present invention.

Referring to FIG. 7, recess lines 21 may be formed at the top and bottom portions of a metal plate 22, and a soldering pattern 23 may be individually joined in each recess line 21. Of course, it is possible to form two or more of the recess lines 21 at the top and bottom portions of the metal plate 22.

FIGS. 8 to 11 are plane views showing a component for a secondary battery, where the pattern of a recess line formed in a metal plate may be modified in various ways, other than a straight pattern.

Figure 10:
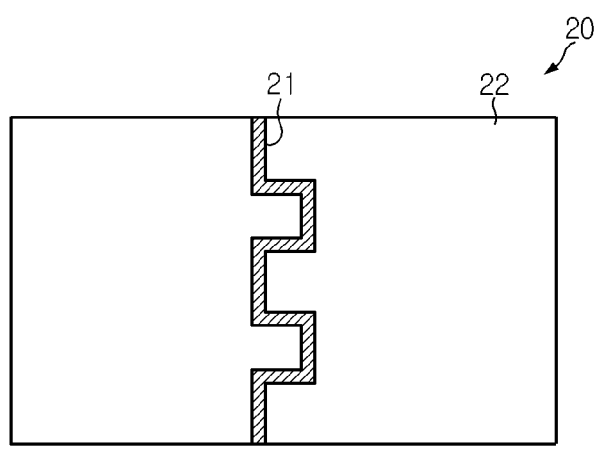

As shown in FIGS. 8 to 11, the recess line 21 may have a pattern selected from a saw-toothed pattern (FIG. 8), a wave pattern (FIG. 9), and a zigzag pattern (FIG. 10). Also, the recess line 21 may have a combination of such patterns.

Figure 11:
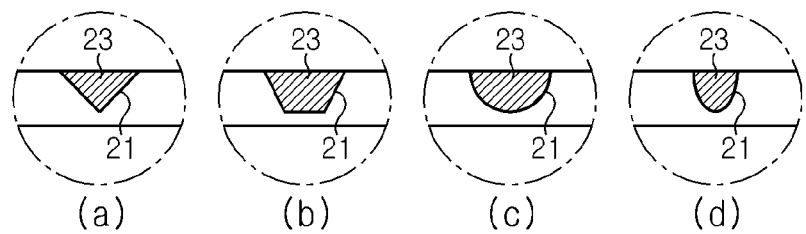
FIG. 11 are cross-sectional views showing various cross-sectional structures of a soldering pattern included in a component for a secondary battery according to the present invention.

FIG. 11 are cross-sectional views showing a component for a secondary battery, where the cross-sectional structure of a soldering pattern 23 joined in a recess line 21 may be modified in various ways, other than a square shape.

As shown in FIG. 11, the soldering pattern 23 may have a triangle shape, a trapezoid shape, a semiellipse shape, a semicircle shape, or the like, and a combination thereof is also allowed.

Figure 12:
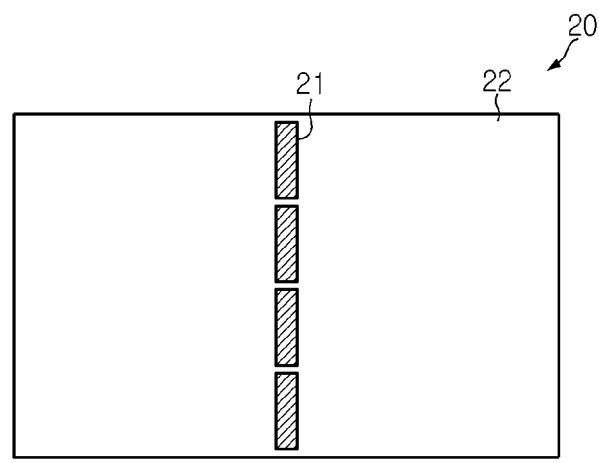
FIG. 12 is a plane view showing a component for a secondary battery, comprising a recess line having a non-continuous pattern in accordance with the present invention.

FIG. 12 shows that a recess line 21 formed in a metal plate 22 may have a non-continuous pattern. Such a non-continuous pattern may be applied to the various shapes of the recess line 21 shown in FIGS. 6 to 11.

Figure 13:
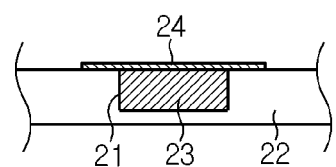
FIG. 13 is a cross-sectional view showing a component for a secondary battery, comprising a recess line covered with an insulating tape on the top thereof in accordance with the present invention.

FIG. 13 shows that the top of the soldering pattern 23 joined in a recess line 21 may be covered with an insulating tape 24. The insulating tape 24 may be used for all kinds of components for a secondary battery described in the present invention. The insulating tape 24 may be made of any one selected from the group consisting of polyolefin film, polypropylene film, acid modified polypropylene, and a combination thereof, but the present invention is not limited thereto. Although not described herein, the insulating tape 24 may be used on the bottom surface of the metal plate 22 corresponding to the bottom portion of the soldering pattern 23.

Figure 14:
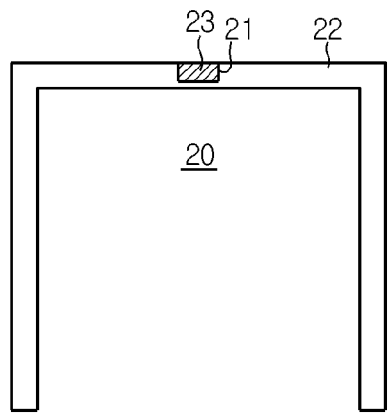
FIG. 14 is a cross-sectional view showing a component for a secondary battery, which may be bent in various shapes in accordance with the present invention.

FIG. 14 shows the component 20 for a secondary battery, where the shape of the component may be modified in various ways by bending, as necessary. The modified shape may be in various shapes including a ⊏ shape of FIG. 14.

Figure 15:
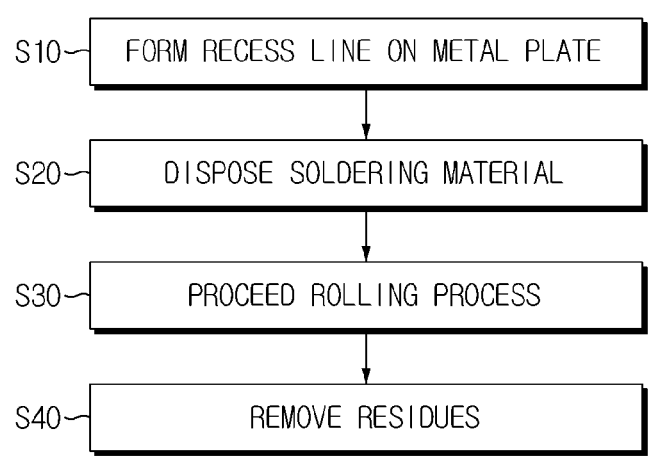
FIG. 15 is a flowchart showing procedures for manufacturing a component for a secondary battery according to an embodiment of the present invention.

FIG. 15 is a flowchart showing procedures for manufacturing a component for a secondary battery according to the present invention.

Referring to FIG. 15, a metal plate is prepared and at least one recess line is formed on the top of the metal plate, the bottom thereof, or both (S10).

The recess line may be formed by using any one selected from a physical or chemical etching technology, a mechanical cutting technology using a saw blade or the like, a local scratching technology using a high hardness knife such as a diamond, an etching technology using an electron beam, and a skiving technology.

The recess line may have various patterns and cross-sectional structures, as described above.

The width, the depth, and the cross-section of the recess line affect a local heating area located at the bottom of the recess line, or an electrical property or a mechanical property of a component for a secondary battery. Accordingly, the width, the depth, and the cross-section of the recess line should be determined, after designing a maximum voltage and a maximum current condition allowable in a component for a secondary battery, an over-current level intended to interrupt by using a component for a secondary battery, and an electrical property or a mechanical property, intended to assign to a component for a secondary battery.

When the recess line is formed, a soldering material is disposed at the place where the recess line is formed (S20). For the soldering material, a soldering wire which has a cross-sectional structure identical or similar to that of the soldering pattern may be used. Alternatively, a soldering paste in which soldering fine powders are dispersed may be used as a soldering material.

The contents of tin, copper, and additional metal contained in the soldering materials are determined in consideration of a melting temperature range assigned to a soldering pattern which will be formed in the recess line, an over-current level intended to interrupt by using a component for a secondary battery, and an electrical property or a mechanical property, intended to assign to a component for a secondary battery.

When the soldering materials are disposed, a rolling process proceeds at least at the place where the soldering materials are disposed, by applying pressures with a jig, a roller or the like (S30).

In this process, thermal energy capable of causing a local melting is applied to the place where the soldering materials are in contact with the inner surface of the recess line. Then, an alloy is formed between a metal component constituting the metal plate and the soldering materials in the contact interface therebetween. Like this, when an alloy is formed from different metal components, the surface resistance formed at the interface between the soldering pattern and the metal plate may be minimized.

The thermal energy may be applied by using various methods such as a thermal conductivity method, an ultrasonic vibration method, an electron-beam radiation method, an electromagnetic inducing method, or the like.

However, the present invention is not limited to a specific method for applying thermal energy, and may use various known methods in the art, which can generate thermal energy at the portion to which pressures are applied while a rolling process proceeds.

After completing the rolling process, the residues of the soldering material are removed from the portion to which the pressure is applied, to complete the manufacturing of the component for a secondary battery (S40).

The component 20 for a secondary battery according to the present invention may be used in various ways in order to manufacture a secondary battery or a multi-battery apparatus.

Figure 16:
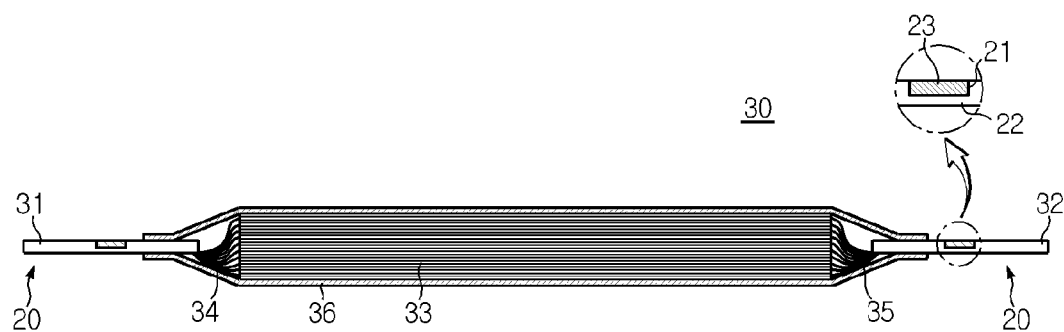
FIG. 16 is a cross-sectional view showing a secondary battery, where a component for a secondary battery according to the present invention is used as an electrode lead.

FIG. 16 is a cross-sectional view showing a pouch type lithium secondary battery according to an embodiment of the present invention, where the pouch type lithium secondary battery is manufactured by using the component for a secondary battery described above.

Referring to FIG. 16, the secondary battery 30 according to the present invention includes an electrode assembly 33 in which a cathode lead 31 and an anode lead 32 are electrically connected to each other.

The cathode lead 31 and the anode lead 32 have a structure substantially identical to the component 20 for a secondary battery according to the present invention. That is, each of the cathode lead 31 and the anode lead 32 consists of a metal plate in which a soldering pattern 23 is joined in a recess line 21. The recess line 21 and the soldering pattern 23 may also have structures according to various embodiments as described above, instead of the structure shown in FIG. 16.

Meanwhile, the structure of the component 20 for a secondary battery according to the present invention may be applied to either the cathode lead 31 or the anode lead 32. Also, the structures of the component for a secondary battery applied to the cathode lead 31 and the anode lead 32 may be different.

The electrode assembly 33 has a structure aggregating at least one unit cell and each unit cell has a separator between a cathode and an anode. At least one side of the cathode and the anode is coated with active materials required for operating a secondary battery, and an insulating film which interrupts electrical connections between unit cells may be interposed in the adjacent unit cells.

For example, the cathode and anode may be coated with a lithium-based cathode active material and a carbon-based anode active material, respectively. The separator and the insulating film may be made of a polyolefin-based porous polymer film.

Such a secondary battery structure as described above is widely known in the art and the present invention will not be described further in detail herein. Also, it is obvious that the present invention is not limited to the specific structure and the components of an electrode assembly 33.

The electrode assembly 33 includes a plurality of cathode taps 34 and anode taps 35 elongated from each of a cathode and an anode. The plurality of cathode taps 34 and anode taps 35 are integrated by a first welding, and then the integrated taps are respectively joined with the cathode lead 31 and anode lead 32 by a second welding.

The electrode assembly 33 is tightly sealed in a packing 36 to externally expose the ends of the cathode lead 31 and anode lead 32. The packing 36 is made of an aluminum pouch film in which a thermal adhesive layer is formed on its inside facing the electrode assembly 33. Accordingly, the electrode assembly 33 is sealed in the packing 36 by applying heat along the edges of the packing 36. Depending on the type of a secondary battery, the packing 36 may include a liquid electrolyte, a solid electrolyte, a gel-typed electrolyte, or the like therein.

In the secondary battery 30 according to the present invention, when an over-current flows through the electrode leads, the breakage of the electrode leads occurs around the area where a soldering pattern 23 is formed, thereby irreversibly interrupting the over-current flow. Meanwhile, the breakage of the component for a secondary battery which is used as an electrode lead is caused as mentioned above. Accordingly, when the component for a secondary battery according to the present invention is used as an electrode lead, independently of a protection circuit, the secondary battery 30 may be protected from the hazards caused by an over-current.

The component 20 for a secondary battery according to the present invention may be used for various purposes, instead of using an electrode lead of a secondary battery.

That is, the component 20 for a secondary battery may be used as a connector of a module or a pack in order to provide a multi-battery apparatus such as a battery module in which multiple secondary batteries are electrically connected to each other; a battery pack in which multiple battery modules are connected to each other; a pack assembly in which multiple battery packs are electrically connected to each other; or the like. Here, the electrical connection may be made in series, in parallel, or a combination thereof.

Figure 17:
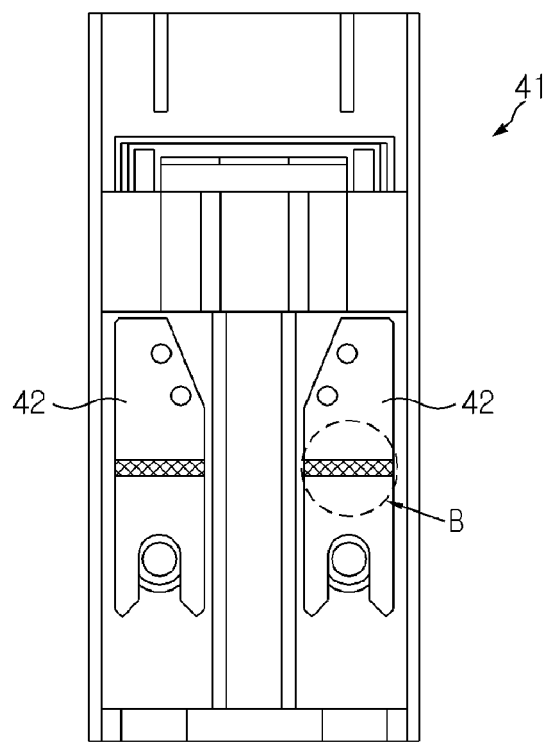
FIG. 17 is a front view showing a secondary battery module, where a component for a secondary battery according to the present invention is used as an external terminal.
Figure 18:
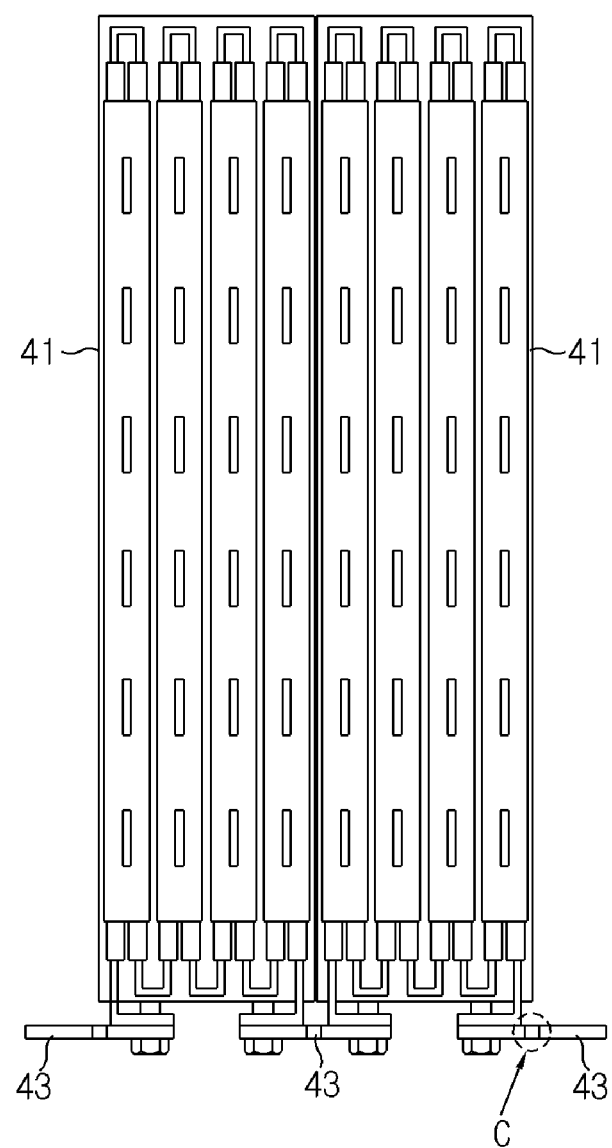
FIG. 18 is a top plane view showing a secondary battery pack, where a component for a secondary battery according to the present invention is used as a connector.
Figure 19:
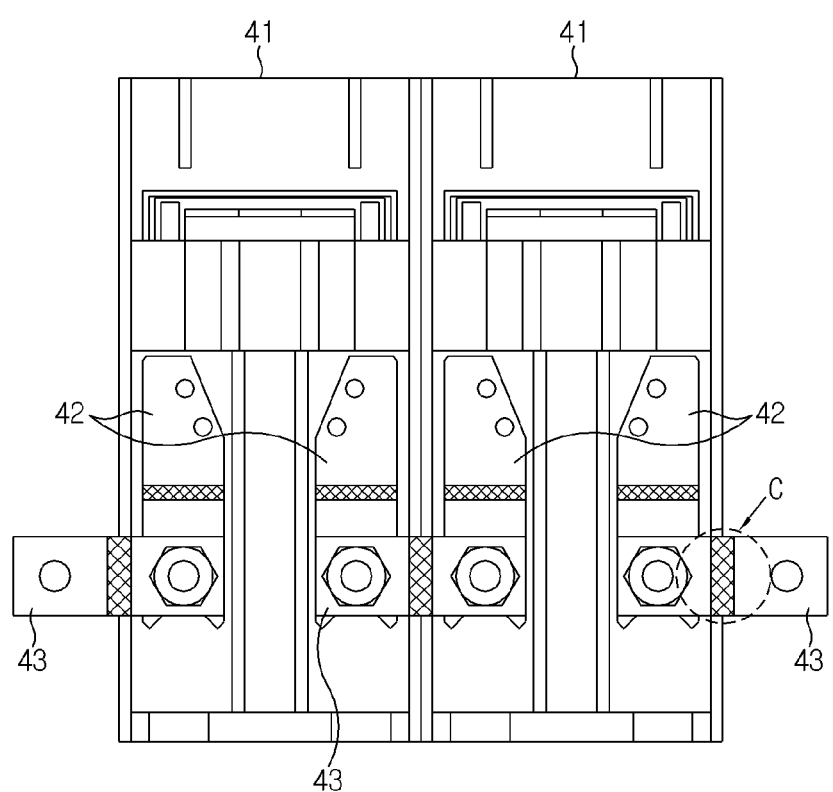
FIG. 19 is a front view showing a secondary battery pack, where a component for a secondary battery according to the present invention is used as a connector.

FIG. 17 is a front view showing a secondary battery module having a structure of which multiple secondary batteries are connected in series and stored in a housing; FIG. 18 is a top plane view showing a secondary battery pack in which two secondary battery modules are serially connected; and FIG. 19 is a front view showing the secondary battery pack.

Referring to FIG. 17, the component for a secondary battery according to the present invention may be used as an external terminal 42 of a secondary battery module 41.

Among the two external terminals 42 of FIG. 17, one is a cathode terminal component and the other is an anode terminal component. The external terminals are electrically coupled to the electrodes of outermost secondary batteries among the plurality of secondary batteries of the secondary module 41.

For example, the external terminal 42 placed at the left side may be connected to the cathode of a secondary battery disposed on the far left, and the external terminal 42 placed at the right side may be connected to the anode of a secondary battery disposed on the far right.

The structures of the external terminals 42 adopt the structure of the component for a secondary battery according to the present invention, and at least a part of the external terminals 42 has the structure of which a soldering pattern is joined in the recess line of the metal plate (see B).

Accordingly, when an over-current flows in the external terminals 42, the metal plate is broken into two pieces around the area where the soldering pattern is joined, thereby irreversibly interrupting the over-current flow.

The width, the depth, the cross-section, and the alloy composition of the soldering patterns included in the external terminals 42 are appropriately determined in consideration of a maximum voltage and a maximum current condition allowable in the external terminals 42, an over-current level intended to interrupt, etc.

The external terminal components 42 correspond to paths where a charge current or a discharge current for a plurality of secondary batteries flows. Therefore, the melting point of each soldering pattern included in the external terminals 42 are preferably higher than that of the soldering pattern included in an electrode lead of a secondary battery. Considering this, it is also preferred that the soldering patterns included in the external terminals 42 have a higher amount of copper content than the soldering pattern included in an electrode lead of a secondary battery.

Referring to FIGS. 18 and 19, the component for a secondary battery according to the present invention may be used as a connector 43 to electrically connect external terminals 42 of adjacent secondary battery modules 41. Here, the electrical connection is made in series, in parallel, or a composition thereof.

The connectors 43 adopt the structure of the component for a secondary battery according to the present invention, so at least a part of the connectors 43 has a structure of which a soldering pattern is joined in the recess line of the metal plate (see C).

Accordingly, when an over-current flows in the connectors 43, the metal plate breaks into two pieces around the area where the soldering pattern is coupled thereto, thereby irreversibly interrupting the over-current flow.

The width, the depth, the cross-section, and the alloy composition of the soldering patterns included in the connectors 43 are appropriately determined, in consideration of a maximum voltage and a maximum current condition allowable in the connectors 43, an over-current level intended to interrupt, etc.

The connectors 43 correspond to paths where a charge current or a discharge current for a plurality of secondary batteries flow. Therefore, the melting point of each soldering patterns included in the connectors 43 are preferably higher than that of the soldering patterns included in external terminals 42 of secondary battery modules 41. Considering this, it is also preferred that the soldering patterns included in the connectors 43 have higher amount of copper content than the soldering patterns included in external terminals 42 of secondary battery modules 41.

Although not shown in drawings, it is obvious that the component for a secondary battery according to the present invention may be used as a connector to electrically connect secondary battery packs to each other in a multi-battery apparatus configured with a plurality of secondary battery packs, and a connector to connect large-capacity pack assemblies, a unit larger than secondary battery packs, to each other.

The multi-battery apparatus may be used as a large-capacity secondary battery system used for power tools; vehicles powered by electricity including electric vehicles (EV), hybrid vehicles (HEV), and plug-in hybrid electric vehicles (PHEV); electric trucks; or power storage apparatuses.

INDUSTRIAL APPLICABILITY

The present invention has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A component for a secondary battery, comprising:
a metal plate having at least one recess line, and made of a metal selected from the group consisting of copper, aluminum, and copper coated with nickel; and
a soldering pattern joined in the recess line, and having a lower melting point and electrical conductivity than the metal plate,
wherein a thickness of the metal plate in a region in which the soldering pattern is formed is smaller than a thickness of the metal plate in all regions in which the soldering pattern is not formed, and
wherein the recess line has a non-continuous line pattern.

2. The component for a secondary battery according to claim 1, wherein the width of the inner bottom portion of the recess line is narrower than the width of the metal plate.

3. The component for a secondary battery according to claim 2, wherein the bottom portion is non-continuously formed in the width-direction of the metal plate.

4. The component for a secondary battery according to claim 1, wherein the recess line has any one pattern selected from a straight pattern, a zigzag pattern, a saw-toothed pattern, a wave pattern, and a combination thereof.

5. The component for a secondary battery according to claim 1, wherein the recess line is formed on the top surface of the metal plate, the bottom surface thereof, or both.

6. The component for a secondary battery according to claim 1, wherein the soldering pattern is made of a lead-free soldering material containing tin (Sn) and copper (Cu) and containing no lead (Pb).

7. The component for a secondary battery according to claim 6, wherein the content of tin is in the range of 65 to 99.9 wt % and the content of copper is in the range of 0.01 to 35 wt %.

8. The component for a secondary battery according to claim 6, wherein the soldering material farther contains at least one additional metal selected from nickel (Ni), zinc (Zn), and silver (Ag).

9. The component for a secondary battery according to claim 8, wherein the content of the additional metal is in the range of 0.01 to 20 wt %.

10. The component for a secondary battery according to claim 1, wherein the soldering pattern is made of a soldering material having a melting point of 100° C. to 250° C.

11. The component for a secondary battery according to claim 1, wherein the soldering pattern has a cross-section selected from a square shape, a triangle shape, a trapezoid shape, a semiellipse shape, a semicircle shape, and a combination thereof.

12. The component for a secondary battery according to claim 1, which further comprises an insulating tape for covering the soldering pattern.

13. A secondary battery comprising:
an electrode assembly in which a cathode lead and an anode lead are electrically coupled to each other; and
a packing for sealing the electrode assembly to externally expose a part of the cathode lead and the anode lead,
wherein the component for a secondary battery according to claim 1 is used as the cathode lead, the anode lead, or both.

14. A multi-battery apparatus comprising a plurality of secondary batteries electrically connected to each other, and a connector for connecting adjacent secondary batteries to each other,
wherein the component for a secondary battery according to claim 1 is used as the connector.

15. A multi-battery apparatus comprising two or more secondary battery modules having a plurality of secondary batteries therein, and external terminals connected to the modules by using connectors,
wherein the component for a secondary battery according to claim 1 is used as the connectors, external terminals, or both.

16. A multi-battery apparatus comprising two or more secondary battery packs having a plurality of secondary battery modules therein, and external terminals connected to the packs by using connectors, wherein the component for a secondary battery according to claim 1 is used as the connectors, external terminals, or both.

17. A method of manufacturing a component for a secondary battery, comprising:
(1) forming at least one recess line on the surface of a metal plate made of a metal selected from the group consisting of copper, aluminum, and copper coated with nickel; and (2) forming, in the recess line, a soldering pattern having a lower melting point and electrical conductivity than the metal plate, wherein a thickness of the metal plate in a region in which the soldering pattern is formed is smaller than a thickness of the metal plate in all regions in which the soldering pattern is not formed.

18. The method of manufacturing a component for a secondary battery according to claim 17, wherein in step (1) the recess line is formed by using any one selected from an etching technology, a cutting technology, a scratching technology, an etching technology using an electron beam, and a skiving technology.

19. The method of manufacturing a component for a secondary battery according to claim 17, wherein in step (1), the recess line is formed on the top surface of the metal plate, the bottom surface thereof, or both.

20. The method of manufacturing a component for a secondary battery according to claim 17, further comprising:

covering the soldering pattern with an insulating tape on the top thereof.

21. The method of manufacturing a component for a secondary battery according to claim 17, wherein step (2) includes:

disposing a soldering material in the recess line; and applying a thermal energy and pressure to the soldering material.

22. The method of manufacturing a component for a secondary battery according to claim 21, wherein the soldering material is a soldering wire having a cross-sectional structure corresponding to the shape of the recess line or a soldering paste having soldering powders dispersed therein.

23. The method of manufacturing a component for a secondary battery according to claim 21, wherein the thermal energy is applied by using any one selected from a thermal conductivity method, an ultrasonic vibration method, an electron-beam radiation method, an electromagnetic inducing method, and a combination thereof.

* * * * *